United States Patent [19]

Sweeney

[11] Patent Number: 4,856,743

[45] Date of Patent: Aug. 15, 1989

[54] CONTAINER HOLDER

[76] Inventor: John E. Sweeney, 3628 Highbury Ct., Simi Valley, Calif. 93063

[21] Appl. No.: 295,994

[22] Filed: Jan. 12, 1989

[51] Int. Cl.$^4$ ........................................... F16M 13/00
[52] U.S. Cl. ..................................... 248/149; 248/523
[58] Field of Search .............. 248/511, 519, 523, 529, 248/106, 127, 149, 150, 152, 174, 176, 346, DIG. 10; 108/55.1, 55.3; 220/70; 211/175

[56] References Cited

U.S. PATENT DOCUMENTS

| | | | |
|---|---|---|---|
| 1,481,468 | 1/1924 | Juth | 248/523 |
| 1,512,416 | 10/1924 | Gilmore | 248/523 |
| 1,568,758 | 1/1926 | Malcolm | 248/523 |
| 2,524,671 | 10/1950 | Lampe | 248/529 |
| 2,750,138 | 6/1956 | Morris | 248/529 |
| 4,332,366 | 6/1982 | Munt | 248/670 |

Primary Examiner—J. Franklin Foss
Assistant Examiner—Robert A. Olson
Attorney, Agent, or Firm—Jack C. Munro

[57] ABSTRACT

A container holder for preventing accidental spillage of an open-mouthed container which is to be mounted in a snug fitting manner around the base of the container. The container holder is constructed of four identical parts which are interconnected together forming an enclosed area. The members are adjustable with respect to each other so as to vary the size of the enclosed area and therefore have the container holder adapt to different sizes of containers.

2 Claims, 1 Drawing Sheet

CONTAINER HOLDER

BACKGROUND OF THE INVENTION

The field of this invention relates to a container holder for supporting relatively small containers of various shapes in an upright stable position.

Certain vocations and hobbies require the use of open-mouth containers. For example, in welding or soldering the use of an open-mouth container is commonly used on a workbench. A common substance that could be contained within this container would be flux that is used in soldering.

These containers are inherently unstable, generally because of the shape of the container and the weight of the container. A slight jarring of the workbench or inadvertent touching of the container frequently causes the container to overturn and spill the contents. Also, at times, in order for the operator to avoid overturning of the container, the operator will frequently hold the container in one hand while holding a brush or stylist in the other hand. Needless to say, the operators hands under such circumstances are not free to hold the object that is being worked on.

Such containers are constructed of many different sizes. In the past, if a device is employed to hold a particular type of container in the upright position, that particular device is not able to be used with other types of containers because the other type of containers are a different size or shape.

SUMMARY OF THE INVENTION

The primary objective of the present invention is to provide a container holder which connects to a container to prevent such from tipping and to free the hands of the operator during using of the contents of the container.

Another objective of the present invention is to construct a container holder which can be manufactured inexpensively and therefore sold and used by the consumer at an inexpensive cost.

Another objective of the present invention is to construct a container holder of a plurality of identical parts with there only being one type of part thereby minimizing the cost of any mold associated with the manufacture of the container holder of the present invention.

Another objective of the present invention is to provide a container holder which can be adjusted to accommodate a wide range of different sizes and shapes of containers.

The container holder of the present invention is composed of four in number of members each of which are identical. Each member is basically thin and elongated with open end thereof being formed into a knob which is substantially smaller in width than the main body section of the member. Within the main body section is located an elongated slot. The main body section, in the area of the elongated slot, can be slightly deflected to accommodate insertion of a knob of another member. Between the knob and the main body section is a necked-down area. This necked-down area of a member is to connect with a slot of another member. All the members are to be located perpendicular to each other forming an enclosed area. Each member is connected to two in number of other members and each member is to be slideably movable relative to both of those members. This sliding movement is for the purpose of increasing or decreasing the size of the enclosed area. The base of a container is to be located within that enclosed area with the members being moved relative to each other into a snug position about the base of the container. The side walls of the slot are serrated which are to engage with a pair of ridges formed in the necked-down area so as to provide a ratchet type of movement.

DETAILED DESCRIPTION OF THE SHOWN EMBODIMENT

Figure 1:
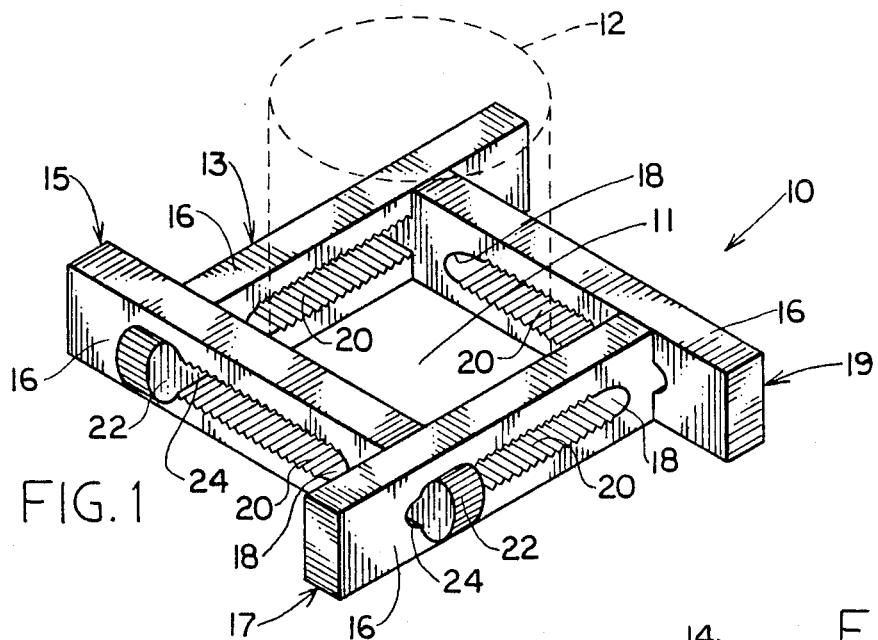
FIG. 1 is an isometric view of the container holder of the present invention showing the container holder in the position to accommodate a large size container.

Referring particularly to the drawing, there is shown the container holder 10 of this invention. Within FIG. 1, the container holder 10 is shown being mounted around the base of a large sized cylindrical shaped container 12. In FIG. 2 of the drawing, the container holder 10 is being shown being mounted around the base of a much smaller sized cylindrical container 14. It is to be understood that both containers 12 and 14 will have an open mouth (not shown). Also, it is considered to be within the scope of this ivnention that the container holder 10 could be utilized in conjunction with other than cylindrical containers and actually with any shape of conventional container.

It is to be noted that containers 12 and 14 are located within an enclosed space 11. The size of the enclosed space 11 can be varied as is readily apparent in comparing of FIGS. 1 and 2. It is to be noted that this enclosed space 11 can be either rectangular or square. It has been found that if the shape of the enclosed space 11 is polygonal, such will operate satisfactorily to almost any shape of container even the cylindrical containers 12 and 14.

The container holder 10 is constructed of four in number of identical members 13, 15, 17 and 19 with each member having a main body section 16. Within this main body section 16 is located an elongated slot 18. The upper and lower side walls of the elongated slot 18 are formed into a series of ridges resembling serrations 20.

Integrally attached to one end of the main body section 16 is a rounded head knob 22. The width of the knob 22 is less than the width of the main body section 16. Located between the knob 22 and the main body section 16 is a necked-down section 24. Included within this necked-down section 24 are a pair of ridges 26. It is to be understood that in both the upper and the lower surfaces of the necked-down area 24 there is located a ridge 26. The upper ridge 26 is to engage with the upper serrated surface of the slot 18 and the bottom ridge 26 connects with the serrations 20 formed on the bottom surface of the slot 18.

Figure 3:
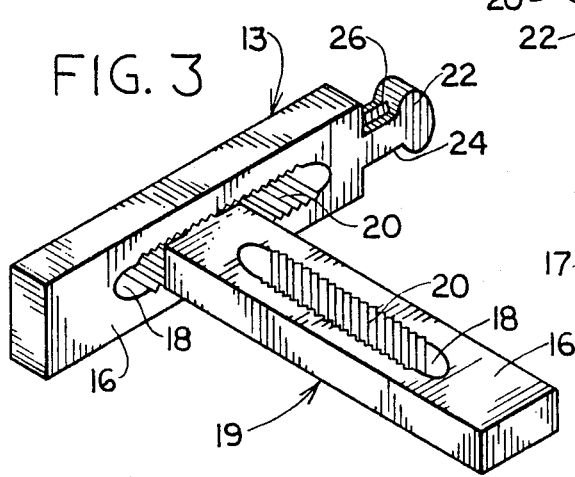
FIG. 3 is an isometric view of a pair of the members incorporated within the container holder of the present invention showing one type of connecting arrangement between the members.
Figure 4:
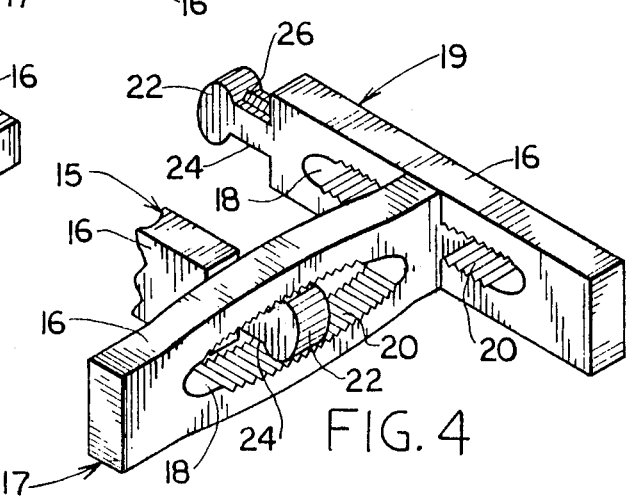
FIG. 4 is an isometric view of three in number of the members depicting another type of connecting arrangement between the members.

The material of construction of the main body section 16 will normally be that of a plastic. The type of plastic that is to be utilized is to permit some element of deflection so that the knob 22 can be inserted as shown in FIG. 4 of the drawings within the slot 18. Normally, in assembling of the members, the member is oriented in a ninety degree displaced position relative to the other member to which it is being connected. This ninety degree displaced position is depicted in FIG. 3 of the drawing. When in the completely inserted position, as is depicted within FIG. 3, the main body section 16 of the member 19 is then physically pivoted ninety degrees which will cause the ridges 26 to engage with the serrations 20. This type of connection procedure is to be completed for members 13, 17 and 19. However, the final connection between the members 15 and 17 requires the knob 22 be inserted directly into the slot 18 as is shown in FIG. 4 of the drawing. During this direct insertion, the side walls of the slot 18 are required to deflect as shown.

Figure 2:
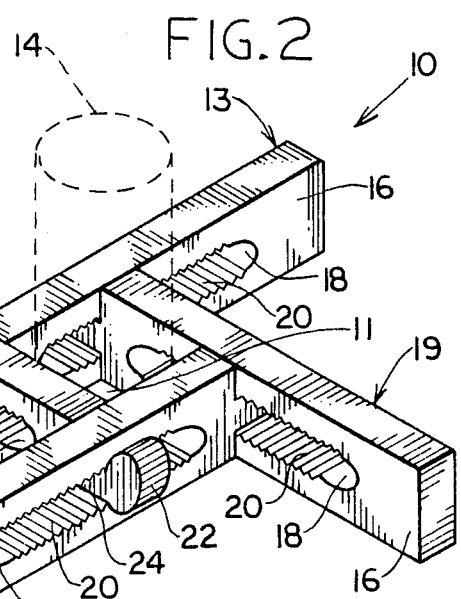
FIG. 2 is a view, similar to FIG. 1, but showing the container holder in a position to connect with a smaller sized container.

Once all the four in number of members 13, 15, 17 and 19 have been connected together, the members 13, 15, 17 and 19 can be moved within the slots 18 to either decrease the size of the enclosed space 11 as shown in FIG. 2 or to increase the size as shown in FIG. 1. It is normal to insert the container, either container 12 or 14, within the enclosed space 11 and then move the members 13, 15, 17 and 19 so that such snugly abuts against the base of the container 12 or 14. The movement of the members 13, 15, 17 and 19 is accomplished in a ratcheting action due to the serrations 20.

What is claimed is:

1. A container holder for preventing accidental spillage of an open container comprising:

a plurality of members, said members being interconnected defining an enclosed area within which there is adapted to be located the open container, said members including adjustment means for varying the size of said enclosed area, said adjustment means comprising:

each said member having a main body section, an elongated slot formed within each said main body section, each said member having an integral knob at one end thereof, a necked-down area formed between said knob and said main body section, a said necked-down area of one said member to connect with a said elongated slot of another said member with the one member being slidable relative to the other member; and said main body section being elastically deflectable to increase the width of said elongated slot to thereby permit direct insertion of said knob through said slot to connect said necked-down area with said slot.

2. The container holder as defined in claim 1 wherein: the wall surface of said elongated slot being serrated, said necked-down area of each said member including a ridge, said ridge to be movable relative to said serrated surface in a ratchet-like manner.

* * * * *